United States Patent
Ikeno et al.

(10) Patent No.: US 10,231,378 B2
(45) Date of Patent: Mar. 19, 2019

(54) BLADE MOUNTING STRUCTURE OF LAWN MOWER

(71) Applicant: HONDA MOTOR CO., LTD., Tokyo (JP)

(72) Inventors: Tetsuro Ikeno, Wako (JP); Shoji Hasei, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 14/670,619

(22) Filed: Mar. 27, 2015

(65) Prior Publication Data

US 2015/0271995 A1    Oct. 1, 2015

(30) Foreign Application Priority Data

Mar. 27, 2014    (JP) ................................. 2014-065929

(51) Int. Cl.
*A01D 34/73*    (2006.01)
*A01D 34/68*    (2006.01)
*A01D 34/82*    (2006.01)

(52) U.S. Cl.
CPC .......... *A01D 34/733* (2013.01); *A01D 34/68* (2013.01); *A01D 34/828* (2013.01)

(58) Field of Classification Search
CPC .... A01D 34/733; A01D 34/76; A01D 34/828; A01D 34/68; A01D 34/6806; A01D 2034/6837; A01D 2101/00; A01D 34/736
USPC .......................................................... 56/255
See application file for complete search history.

(56) References Cited

U.S. PATENT DOCUMENTS

| | | | | |
|---|---|---|---|---|
| 2,963,844 | A | * 12/1960 | Engler ................. | A01D 34/736 30/347 |
| 3,252,304 | A | * 5/1966 | Moody .............. | A01D 34/6806 464/36 |
| 3,630,010 | A | * 12/1971 | Rester ................. | A01B 51/026 172/247 |
| 3,716,973 | A | 2/1973 | Kidd | |
| 3,890,773 | A | * 6/1975 | Frost ...................... | A01D 34/63 474/181 |

(Continued)

FOREIGN PATENT DOCUMENTS

| EP | 2664229 A1 * 11/2013 | ........... A01D 34/733 |
|---|---|---|
| EP | 2923551 A1 * 9/2015 | ............. A01D 34/68 |

(Continued)

OTHER PUBLICATIONS

Japanese Office Action dated Jun. 13, 2017, Application No. 2014-065929, English translation included.

*Primary Examiner* — Thomas B Will
*Assistant Examiner* — Joan D Misa
(74) *Attorney, Agent, or Firm* — Rankin, Hill & Clark LLP

(57) ABSTRACT

A blade mounting structure of a lawn mower includes a blade holder including a shaft-mounted section connected to an output shaft of an engine, and a blade mounting section having a grass cutting blade mounted thereto. The blade holder further includes a connecting leg section located between the shaft-mounted section and the blade mounting section and interconnecting the shaft-mounted section and the blade mounting section. The connecting leg section has a wall thickness dimension gradually decreasing in a direction from the shaft-mounted section toward the blade mounting section.

6 Claims, 14 Drawing Sheets

(56) References Cited

U.S. PATENT DOCUMENTS

| | | | | |
|---|---|---|---|---|
| 4,084,397 A * | 4/1978 | McGrath | A01D 34/63 |
| | | | 474/169 |
| 4,205,510 A * | 6/1980 | Raniero | A01D 34/82 |
| | | | 56/12.9 |
| 4,307,558 A * | 12/1981 | Bent | A01D 34/6812 |
| | | | 56/11.3 |
| 4,704,848 A * | 11/1987 | Nannen | A01D 34/68 |
| | | | 56/17.2 |
| 4,738,089 A * | 4/1988 | Smucker | A01D 34/6806 |
| | | | 56/255 |
| 4,771,593 A * | 9/1988 | Lee | A01D 34/733 |
| | | | 464/33 |
| 5,012,633 A * | 5/1991 | Ito | A01D 43/077 |
| | | | 56/12.9 |
| 5,181,372 A * | 1/1993 | Hayek | A01D 34/81 |
| | | | 56/17.4 |
| 5,187,926 A * | 2/1993 | Rhoads | A01D 34/84 |
| | | | 56/16.7 |
| 5,619,847 A * | 4/1997 | Cox, Jr. | A01D 34/73 |
| | | | 56/255 |
| 6,119,350 A * | 9/2000 | Sutliff | A01D 34/736 |
| | | | 30/276 |
| 6,389,786 B1 * | 5/2002 | Bergsten | A01D 75/30 |
| | | | 56/17.5 |
| D696,301 S * | 12/2013 | DeLeon | D15/17 |
| 8,869,369 B1 | 10/2014 | Roach | |
| 2002/0043062 A1 * | 4/2002 | Frazer | A01D 34/6806 |
| | | | 56/255 |
| 2014/0208710 A1 * | 7/2014 | Roth | A01D 34/733 |
| | | | 56/255 |
| 2014/0230397 A1 * | 8/2014 | Roth | A01D 34/733 |
| | | | 56/255 |
| 2016/0120122 A1 * | 5/2016 | Ladd, Jr. | A01D 34/733 |
| | | | 56/255 |
| 2016/0324067 A1 * | 11/2016 | Skinner | A01D 34/733 |

FOREIGN PATENT DOCUMENTS

| | | | | |
|---|---|---|---|---|
| GB | 2061687 A * | 5/1981 | | A01D 34/736 |
| JP | 51-16324 | 5/1976 | | |
| JP | 61-000029 | 1/1986 | | |
| JP | 61-131729 | 8/1986 | | |
| JP | 05-022031 | 6/1993 | | |
| JP | H06-75126 | 10/1994 | | |
| JP | 2001-171677 | 6/2001 | | |
| JP | 2008-22788 | 2/2008 | | |
| JP | 4232558 | 3/2009 | | |

* cited by examiner

BLADE MOUNTING STRUCTURE OF LAWN MOWER

FIELD OF THE INVENTION

The present invention relates generally to a blade mounting structure of a lawn mower where a grass cutting blade is mounted on an output shaft of a power source via a blade holder.

BACKGROUND OF THE INVENTION

Among the conventionally-known lawn mowers is one disclosed, for example, in Japanese Examined Utility Model Publication H-05-22031 (hereinafter referred to as "Patent Literature 1"), where an output shaft extends downward from a power source and a cylindrical section of a blade holder is fitted over a lower end portion of the output shaft, and where a grass cutting blade is attached or mounted to a lower end portion of the blade holder by means of a bolt. For cutting grass by the lawn mower disclosed in Patent Literature 1, grass cutting operation is performed where the grass cutting blade is rotated by rotations of the power source being transmitted to the grass cutting blade via the output shaft and the blade holder.

However, the lawn mower disclosed in Patent Literature 1 tends to present a problem that, during the grass cutting operation, the grass cutting blade and the output shaft can undesirably deform by the grass cutting blade hitting an obstacle, such as a sprinkler. Thus, another type of lawn mower has been proposed, for example, in Japanese Examined Utility Model Publication SHO-61-29 (hereinafter referred to as "Patent Literature 2"), which the grass cutting blade is attached to a lower end portion of the blade holder by means of a shear pin (i.e., impact absorbing member), in order to avoid the aforementioned problem. When the grass cutting blade hit an obstacle, such as a sprinkler, the lawn mower disclosed in Patent Literature 2 can prevent undesired deformation of the output shaft by fracturing the shear pin and thereby preventing transmission of an impact load to the output shaft.

However, the lawn mower disclosed in Patent Literature 2 requires fracturing of the shear pin in order to prevent transmission of an impact load to the output shaft. The shear pin (i.e., impact absorbing member) thus fractured would come off the grass cutting blade and drop down to the ground surface. Therefore, it would take time and labor to pick up the dropped shear pin; in this respect, the lawn mower disclosed in Patent Literature 2 still has a room for improvement.

SUMMARY OF THE INVENTION

In view of the foregoing prior art problems, it is an object of the present invention to provide an improved blade mounting structure of a lawn mower which can prevent, without fracturing the impact absorbing member, an impact load from transmitting to the output shaft.

In order to accomplish the above-mentioned object, the present invention provides an improved blade mounting structure of a lawn mower, which comprises a blade holder including a shaft-mounted section connected to an output shaft of a power source, and a blade mounting section having a grass cutting blade mounted thereto, the blade holder further including a connecting leg section located between the shaft-mounted section and the blade mounting section and interconnecting the shaft-mounted section and the blade mounting section, the connecting leg section having a wall thickness dimension gradually decreasing in a direction from the shaft-mounted section toward the blade mounting section.

In the blade mounting structure of the present invention, the blade holder includes the connecting leg section (functioning as an impact absorbing member), and the shaft-mounted section and the blade mounting section are interconnected by the connecting leg section. The connecting leg section has an upper end portion connecting to the shaft-mounted section and a lower end portion connecting to the blade mounting section. Thus, when the grass cutting blade has hit an obstacle, such as a sprinkler provided on the lawn, an impact load is input to the lower end portion of the connecting leg section by way of the grass cutting blade and the blade mounting section. Due to the impact load thus input to the lower end portion of the connecting leg section, a great bending moment and twisting moment (torque) act on the upper end portion of the connecting leg section.

To deal with such a great bending moment and twisting moment, the connecting leg section in the present invention is formed to gradually decrease in wall thickness dimension in a direction from the upper end portion adjoining the shaft-mounted section toward the lower end portion adjoining the blade mounting section. Thus, a yield point of the connecting leg section to the impact load (stress) can be made substantially uniform throughout an entire region from the upper end portion to the lower end portion. In other words, a rigidity and strength of the connecting leg section to the impact load can be set substantially uniform throughout the entire region from the upper end portion to the lower end portion. Thus, when an impact load has acted on the lower end portion of the leg section, it is possible to efficiently absorb the bending and twisting moments by the entire region of the connecting leg section being deformed suitably by the input impact load. By the connecting leg section being deformed to absorb the bending moment and twisting moment, the present invention can prevent the impact load from transmitting to the output shaft without causing fracture of the connecting leg section.

Further, while grass is being cut by the grass cutting blade, a greater load would act on the upper end portion of the connecting leg section than on the lower end portion of the connecting leg section. Because the connecting leg section has the wall thickness dimension gradually decreasing in the direction from the upper end portion adjoining the shaft-mounted section toward the lower end portion adjoining the blade mounting section, the present invention can suitably bear the load input from the grass cutting blade to the upper end portion of the connecting leg section during the grass cutting. Thus, rotations of the power source can be transmitted stably to the grass cutting blade via the connecting leg section, so that the lawn mower can clip the grass by the rotations of the grass cutting blade in a stable and efficient manner.

Preferably, the connecting leg section comprises a plurality of stay leg portions disposed about the output shaft, and an interval between the stay leg portions gradually increases in the direction from the shaft-mounted section toward the blade mounting section. Alternatively, the connecting leg section may comprise a cylindrical leg section disposed about the output shaft, and the cylindrical leg section has an inner diameter gradually increasing in the direction from the shaft-mounted section toward the blade mounting section. Thus, even when the connecting leg section has been deformed to absorb an impact load, a space can be secured in an interior region between the plurality of stay leg portions or in the interior of the cylindrical leg section. Consequently, a tool can be inserted into the space, so that the blade holder can be dismounted from the output shaft with the inserted tool and the grass cutting blade can be detached from the lawn mower together with the blade holder.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 3 is a perspective view showing the blade mounting structure of

FIG. 2;

DETAILED DESCRIPTION OF THE INVENTION

Now, with reference to the accompanying drawings, a description will be given about and preferred embodiments of a blade mounting structure of the present invention in relation to a case where a lawn mower employing the blade mounting structure of the invention is a walk-behind lawn mower 10.

Figure 1:
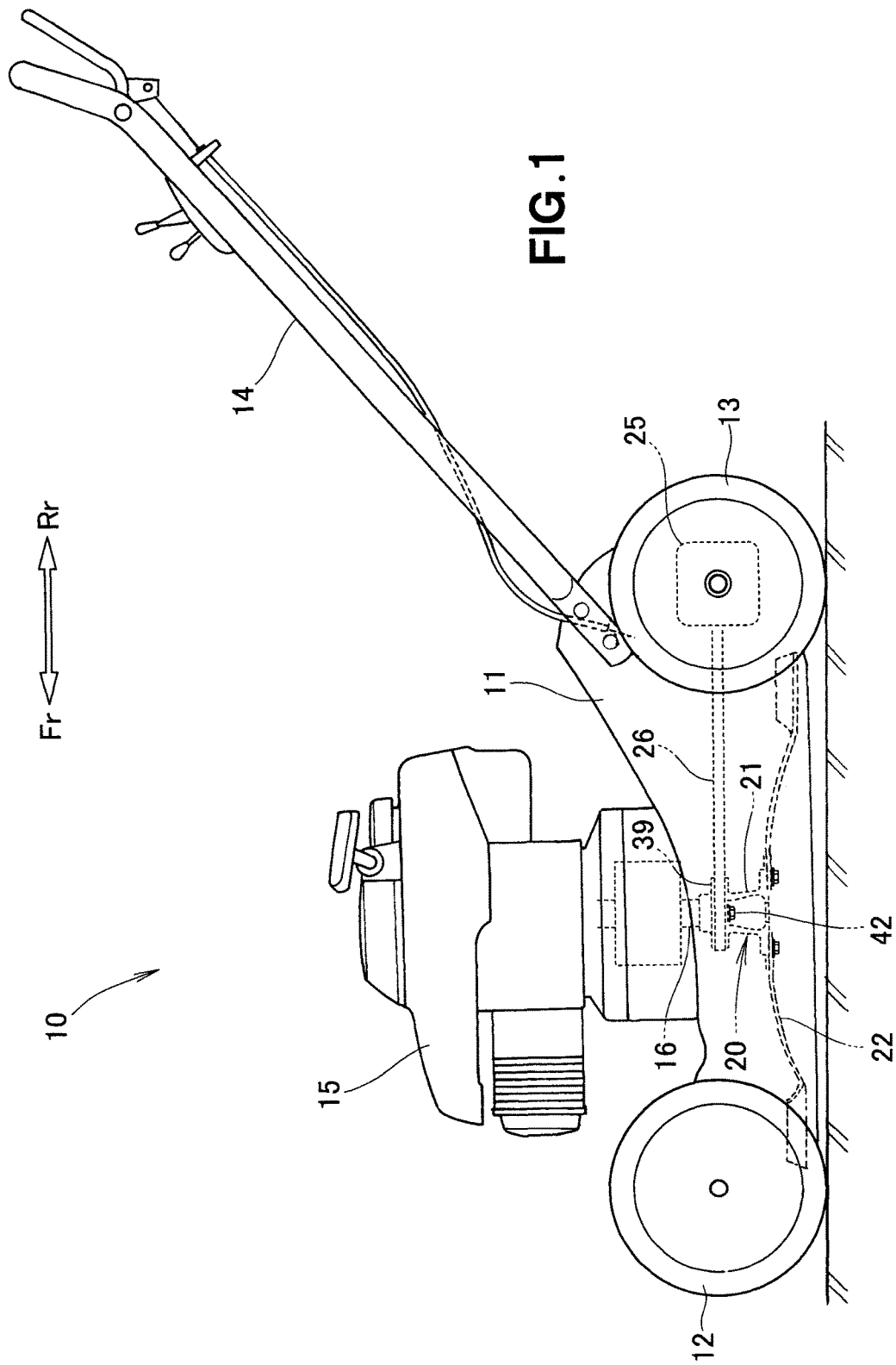
FIG. 1 is a side view of a walk-behind lawn mower equipped with a first embodiment of a blade mounting structure.

FIG. 1 is a side view of the walk-behind lawn mower 10 equipped with a first embodiment of the blade mounting structure 20. As shown in FIG. 1, the first embodiment of the walk-behind lawn mower 10 includes: a downwardly-opening housing 11; front and rear wheels 12 and 13 provided on the housing 11; an operating handle 14 provided on a rear portion of the housing H; an engine (i.e., power source) 15 provided over the housing 11; an output shaft 16 extending downward from the engine 16; and the blade mounting structure 20 mounted on the output shaft 16.

The blade mounting structure 20 includes a blade holder 21 mounted on the output shaft 16, and a grass cutting blade 22 attached or mounted to the blade holder 21. Thus, rotations of the output shaft 16 are transmitted to the grass cutting blade 22 via the blade holder 21.

In the walk-behind lawn mower 10, a drive belt 26 is mounted or wound on a pulley 39 of the blade holder 21 and a reduction gear mechanism 25. Thus, as the engine 15 is driven, rotations of the output shaft 16 are transmitted to the reduction gear mechanism 25 via the blade holder 21 (i.e., pulley 39) and the drive belt 26. Then, by the rear wheel 13 being rotated by the reduction gear mechanism 25, the walk-behind lawn mower 10 is self-propelled to travel (i.e., self-travels). Further, the rotations of the output shaft 16 are transmitted to the grass cutting blade 22 via the blade holder 21, so that the cutting blade 22 rotates to cut or clip grass. In this manner, the walk-behind lawn mower 10 can clip grass by means of the cutting blade 22 while self-traveling.

Figure 2:
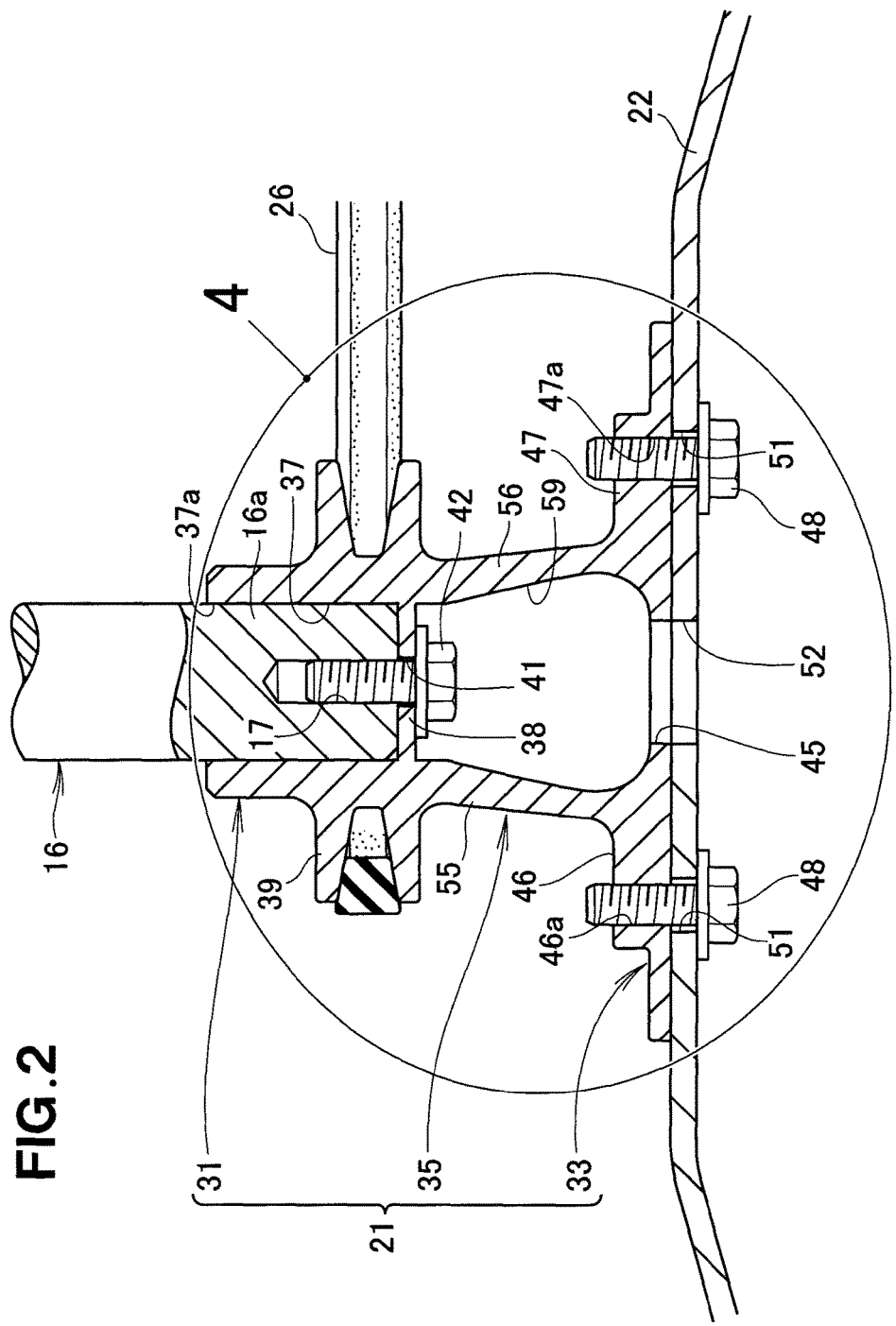
FIG. 2 is a sectional view showing the first embodiment of the blade mounting structure.
Figure 3:
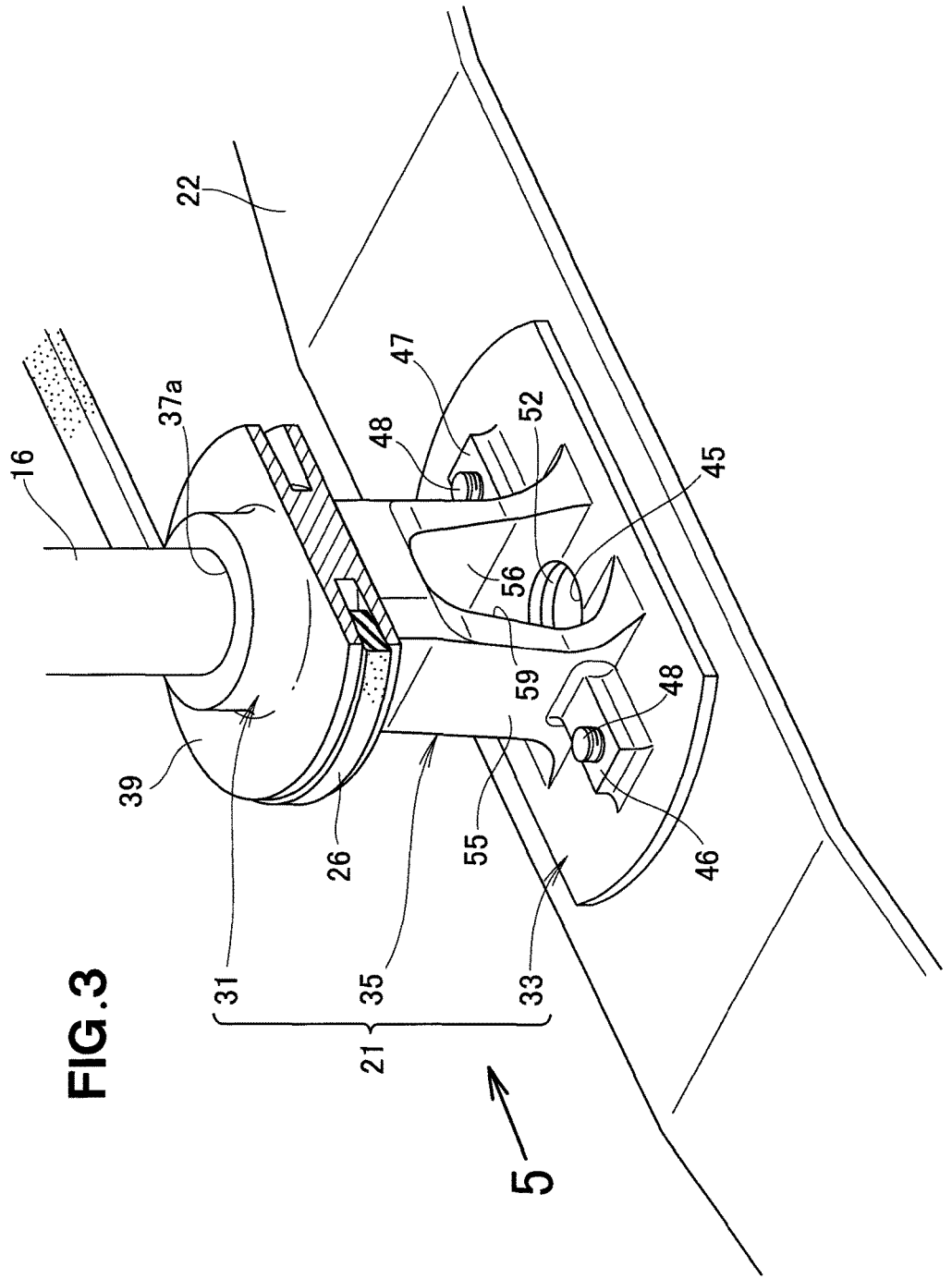

As shown in FIGS. 2 and 3, the blade holder 21 includes: a shaft-mounted section 31 mounted to a lower portion 16a of the output shaft 16; a blade mounting section 33 having the grass cutting blade 22 mounted thereon; and a connecting leg section 35 provided between and interconnecting the shaft-mounted section 31 and the blade mounting section 33.

The shaft-mounted section 31 is a cylindrical section formed in an upper portion of the blade holder 21. The shaft-mounted section 31 has an axial insertion hole 37 formed therein and having an upwardly-opening upper end 37a. The shaft-mounted section 31 further has a bottom portion 38 for closing a lower end portion of the axial insertion hole 37 and having a through-hole 41, and the pulley 39 provided on the outer periphery of a lower portion of the section 31.

The lower portion 16a of the output shaft 16 is fitted in the axial insertion hole 37 of the shaft-mounted section 31, and a bolt 42, which is inserted through the through-hole 41 of the bottom portion 38 of the shaft-mounted section 31, is screwed into a threaded hole 17 of the output shaft 16. In this manner, the shaft-mounted section 31 is mounted to the lower portion 16a of the output shaft 16. The shaft-mounted section 31 and the lower portion 16a of the output shaft 16 are interconnected by means of a key (not shown), so that rotations of the output shaft 16 are transmitted to the shaft-mounted section 31.

With the pulley 39 provided on the outer periphery of the lower portion of the section 31 as noted above, the pulley 39 is located immediately above the connecting leg section 35. Further, with the drive belt 26 wound on the pulley 39 and the reduction gear mechanism 25 (FIG. 1), rotations of the output shaft 16 are transmitted to the rear wheel 13 (FIG. 1) via the blade holder 21, the drive belt 26 and the reduction gear mechanism 25.

The blade mounting section 33, which has a generally rectangular shape as viewed in top plan, has a circular opening portion 45 formed centrally therein, and two bosses 46 and 47 are provided to project adjacent to opposite sides of the opening portion 45. Threaded holes 46a and 47a are formed through the bosses 46 and 47, respectively, and located coaxially with through-holes 51 formed through the grass cutting blade 22.

A bolt 48 passed through one of the through-holes 51 is screwed into the threaded hole 46a, while another bolt 48 passed through the other through-hole 51 is screwed into the threaded hole 47a. Thus, the grass cutting blade 22 is attached to the underside or lower surface of the blade mounting section 33 by means of the bolts 48.

The glass cutting blade 22 has the through-holes 51 formed coaxially with the holes 46a and 47a, and a circular blade opening portion 52 formed through the grass cutting blade 22 between the through-holes 51. The circular blade opening portion 52 is disposed in coaxial alignment with the opening portion 45 of the blade mounting section 33.

Figure 4:
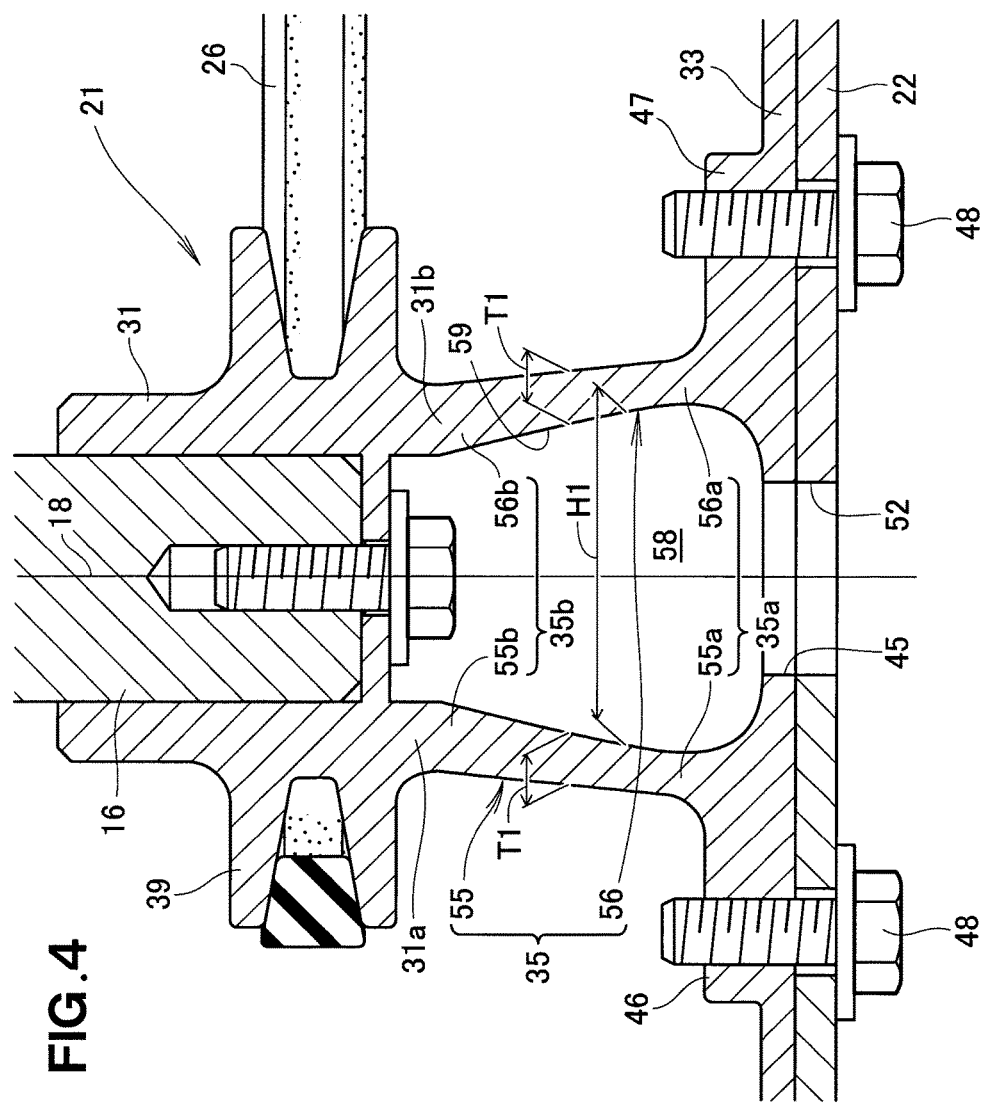
FIG. 4 is an enlarged view showing a section encircled at 4 of FIG. 2.

Further, the connecting leg section 35, as shown in FIG. 4, is an impact absorbing member including a plurality of stay leg portions 55 and 56 located between the shaft-mounted section 31 and the blade mounting section 33. Hereinafter, one of the stay leg portions will be referred to as "first stay leg portion 55" while the other stay leg portion will be referred to as "second stay leg portion 56".

The first stay leg portion 55 has a lower end portion 55a connecting between one of the boss 46 and the opening portion 45, an intermediate portion extending upward from the lower end portion 55a, and an upper end portion 55b extending upward from the intermediate portion and connecting to a one-side lower end portion 31a of the shaft-mounted section 31. The second stay leg portion 56 is located at a position opposite the first stay leg portion 55.

The second stay leg portion 56 is formed in left-right symmetrical relation to the first stay leg portion 55. Namely, the second stay leg portion 56 has a lower end portion 56a connecting between the other boss 47 and the opening portion 45, an intermediate portion extending upward from the lower end portion 56a, and an upper end portion 56b extending upward from the intermediate portion and connecting to an other-side lower end portion 31a of the shaft-mounted section 31.

Thus, the shaft-mounted section 31 and the blade mounting section 33 are interconnected by the first stay leg portion 55 and the second stay leg portion 56 (i.e., by the connecting leg section 35). In this condition, the first stay leg portion 55 and the second stay leg portion 56 are located around the central axis 18 of the output shaft 16. An lower end portion 35a of the connecting leg section 35 comprises respective lower end portions 55a and 56a of the first and second stay leg portions 55 and 56, and an upper end portion 35b of the connecting leg section 35 comprises respective upper end portions 55ab and 56b of the first and second stay leg portions 55 and 56.

Figure 5:
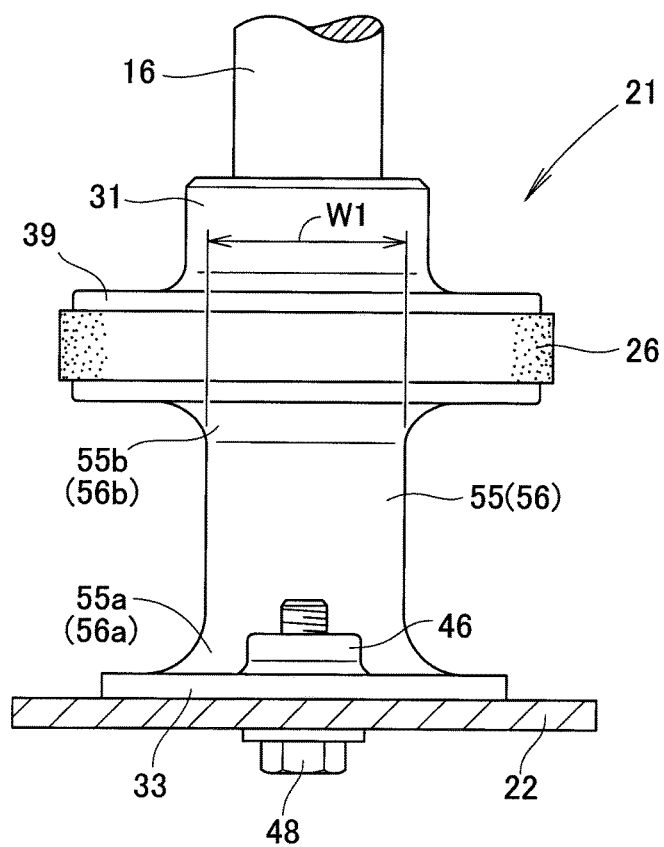
FIG. 5 is a view taken in a direction of arrow 5 of FIG. 3.

As shown in FIG. 5, the first stay leg portion 55 has a uniform width dimension W1 from the upper end portion 55b toward the lower end portion 55a, and similarly to the first stay leg portion 55, the second stay leg portion 56 has a uniform width dimension W1 from the upper end portion 56b toward the lower end portion 56a.

Referring back to FIG. 4, the first stay leg portion 55 has a wall thickness dimension T1 gradually decreasing in a direction from the upper end portion 55b adjoining the shaft-mounted section 31 toward the lower end portion 55a adjoining the blade mounting section 33. Similarly, the second stay leg portion 56 has a wall thickness dimension T1 gradually decreasing in a direction from the upper end portion 56b adjoining the shaft-mounted section 31 toward the lower end portion 56a adjoining the blade mounting section 33.

The reason why the first and second stay leg portions 55 and 56 (i.e., connecting leg section 35) gradually decrease in wall thickness dimension T1 in the direction from their upper end portion toward their lower end portion is (i.e., in the direction from the shaft-mounted section 31 to the blade mounting section 33) as follows. Namely, the upper end portion 35b of the connecting leg section 35 connects to the shaft-mounted section 31, and the lower end portion 35a of the connecting leg section 35 connects to the blade mounting section 33. Thus, when the grass cutting blade 22 has hit an obstacle, such as a sprinkler provided on the lawn, an impact load is input to the lower end portion 35a of the connecting leg section 35 by way of the grass cutting blade 22 and the blade mounting section 33. Due to the impact load thus input to the lower end portion 35a of the connecting leg section 35, a great bending moment and twisting moment (torque) act on the upper end portion 35b of the connecting leg section 35.

To deal with such a great bending moment and twisting moment (torque), the connecting leg section 35 is formed to gradually decrease in wall thickness dimension T1 in the direction from the upper end portion 35b adjoining the shaft-mounted section 31 toward the lower end portion 35a adjoining the blade mounting section 33. Thus, a yield point of the connecting leg section 35 to the impact load (stress) can be made substantially uniform throughout an entire region from the upper end portion 35b to the lower end portion 35a. In other words, a rigidity and strength of the connecting leg section 35 to the impact load are set substantially uniform throughout the entire region between the upper end portion 35b and the lower end portion 35a. In this way, it is possible to efficiently absorb the input impact load by the entire region of the connecting leg section 35 being deformed suitably by the impact load thus input to the lower end portion 35a of the connecting leg section 35.

Further, when grass is being cut by the grass cutting blade 22, a greater load would act on the upper end portion 35b of the connecting leg section 35 than on the lower end portion 35a of the connecting leg section 35. Because the connecting leg section 35 has the wall thickness dimension T1 gradually decreasing in the direction from the upper end portion 35b toward the lower end portion 35a as noted above, it is possible to suitably bear the load input from the grass cutting blade 22 to the upper end portion 35b of the connecting leg section 35 by way of the lower end portion 35a.

Further, in the connecting leg section 35, an interval H1 between the first and second stay leg portions 55 and 56 is formed to gradually increase in the direction from the upper end portion 35b toward the lower end portion 35a, so that a space 58 is defined between the first and second stay leg portions 55 and 56 of the connecting leg section 35 in such a manner as to gradually become greater in the direction from the upper end portion 35b toward the lower end portion 35a. Thus, even when the connecting leg section 35 has been deformed to absorb the impact load, the space 58 can be maintained in a size sufficient to allow a tool to be inserted into the space 58 defined between the first and second stay leg portions 55 and 56.

Further, because the connecting leg section 35 comprises the two, first and second, stay leg portions 55 and 56, an interior region (i.e., space 58) between the first and second stay leg portions 55 and 56 can be viewed by a human operator etc., through a side opening 59 between the first and second stay leg portions 55 and 56, but also the human operator can insert its hand into the space 58 through the side opening 59.

Now, with reference to FIGS. 6 and 7, a description will be given about an example manner in which an impact load F1 is absorbed by the connecting leg section 35 of the blade holder 21. Note that illustration of the drive belt 26 is omitted in FIGS. 6 and 7 for ease of understanding of how the impact load F1 is absorbed by the connecting leg section 35.

Figure 6A:
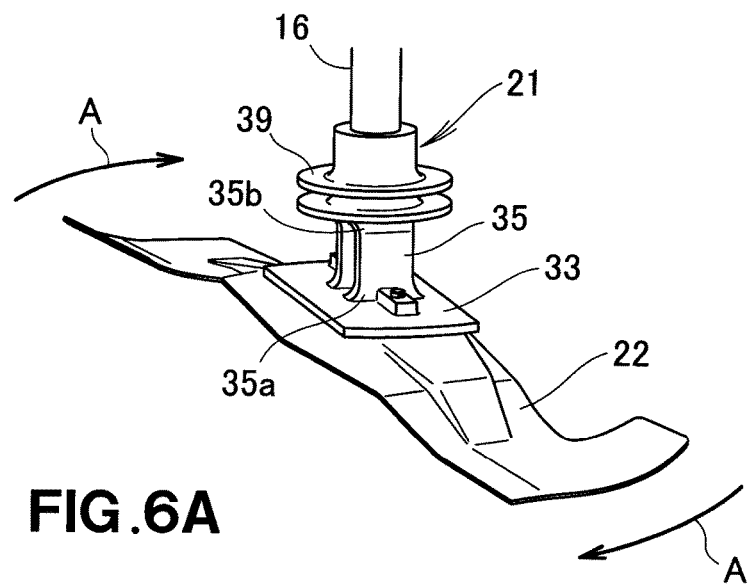
FIGS. 6A and 6B are views explanatory of an example manner in which grass is cut by the lawn mower equipped with the first embodiment of the blade mounting structure.

The blade holder 21 is rotated as indicated by arrow A in FIG. 6A, during which time a greater load would act on the upper end portion 35b of the connecting leg section 35 than on the lower end portion 35a of the connecting leg section 35. Because the connecting leg section 35 is formed in such a manner that the wall thickness dimension T1 (FIG. 2) gradually decreases in the direction from the upper end portion 35b toward the lower end portion 35a as noted above, it is possible to suitably bear the load input from the grass cutting blade 22 to the upper end portion 35b of the connecting leg section 35 by way of the lower end portion 35a. Thus, rotations of the engine 15 (FIG. 1) can be transmitted stably to the grass cutting blade 22 via the connecting leg section 35. In this way, the lawn mower 10 can clip the grass by the rotations of the grass cutting blade 22 in a stable and efficient manner.

Figure 6B:
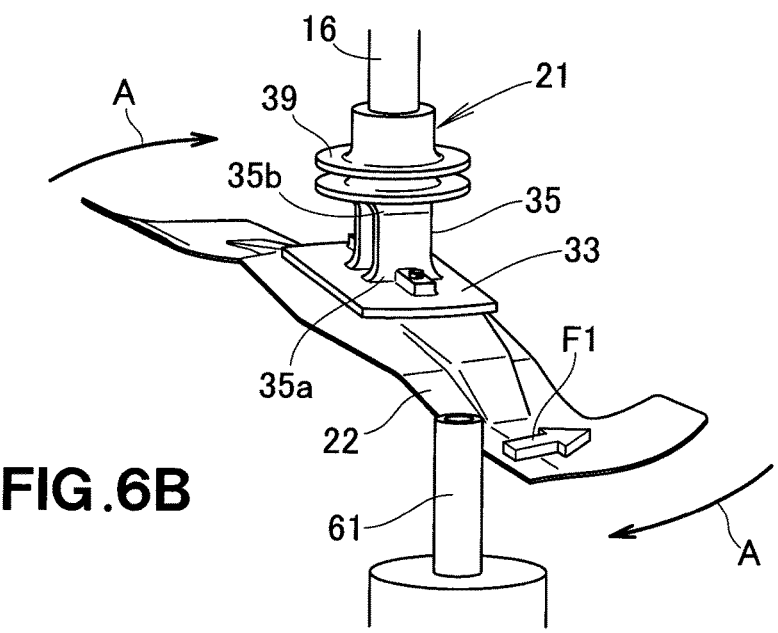

During the grass cutting by the grass cutting blade 22, the grass cutting blade 22 may hit an obstacle, such as a sprinkler 61, as shown in FIG. 6B, so that an impact load F1 is input to the lower end portion 35a of the connecting leg section 35 by way of the grass cutting blade 22 and the blade mounting section 33. Due to the impact load F1 thus input to the lower end portion 35a of the connecting leg section 35, a great bending moment and twisting moment (torque) act on the upper end portion 35b of the connecting leg section 35. To deal with such a great bending moment (torque), the yield point of the connecting leg section 35 to the impact load F1 is set substantially uniform throughout the entire region from the upper end portion 35b to the lower end portion 35a.

Figure 7:
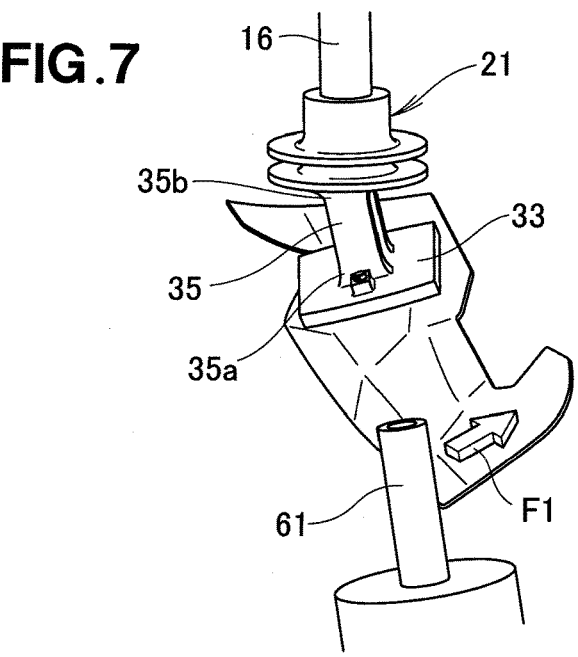
FIG. 7 is a view explanatory of an example manner in which an impact load is absorbed by the first embodiment of the blade mounting structure.

As shown in FIG. 7, the entire region of the connecting leg section 35 can be deformed suitably by the impact load F1 thus input to the lower end portion 35a of the connecting leg section 35, so that the bending moment and twisting moment acting on the connecting leg section 35 due to the impact load F1 can be absorbed efficiently. By the entire region of the connecting leg section 35 being deformed to absorb the bending moment and twisting moment, the instant embodiment can prevent the impact load from undesirably transmitting to the output shaft 16 without causing fracture of the connecting leg section 35.

Figure 8:
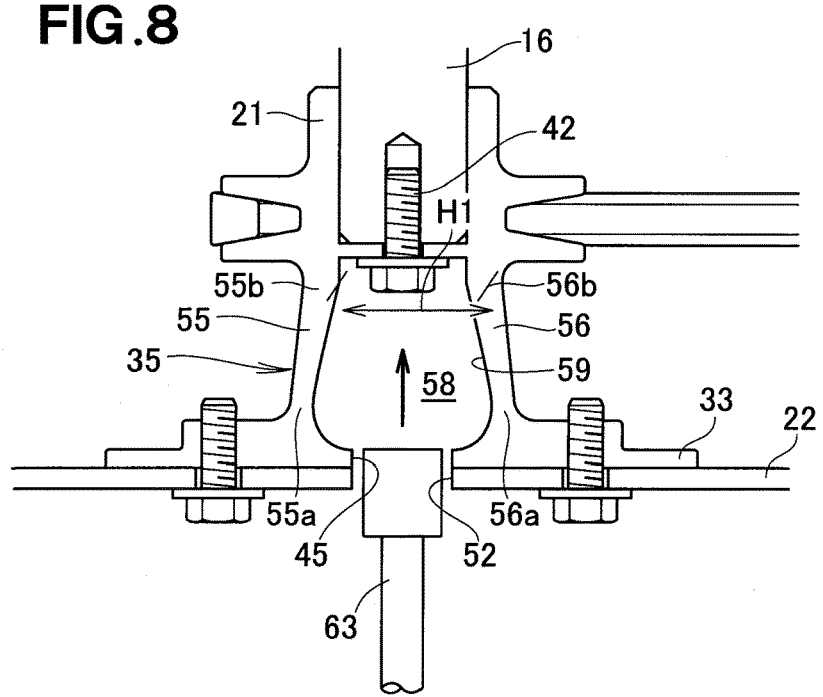
FIG. 8 is a view explanatory of an example manner in which a blade holder is dismounted from an output shaft of a power source with a connecting leg section deformed in the first embodiment of the blade mounting structure.

The following describe, with reference to FIG. 8, an example manner in which the blade holder 21 with the connecting leg section 35 deformed is dismounted from the output shaft 16. As shown in FIG. 8, the first and second stay leg portions 55 and 56 are formed in such a manner that the interval H1 therebetween gradually increases in the direction from their upper end portions 55b and 56b toward their end portions 55a and 56a.

Thus, even when the connecting leg section 35 has been deformed to absorb the impact load F1 (see FIG. 7), the space 58 of a relatively large size can be secured in the interior region between the plurality of stay leg portions 55 and 56. Consequently, a tool 63 can be inserted into the space 58 so that the bolt 42 can be loosened with the inserted tool 63. In this way, the blade holder 21 can be dismounted from the output shaft 16, and the grass cutting blade 22 can be detached from the lawn mower together with the blade holder 21.

During that time, the interior region (i.e., space 58) between the first and second stay leg portions 55 and 56 van be viewed by the human operator etc., through the side opening 59 between the first and second stay leg portions 55 and 56, but also the human operator can insert its hand into the space 58 through the side opening 59. In this way, it is possible to perform, with an increased ease, operation of detaching the blade holder 21 and the grass cutting blade 22 with the tool 63 inserted into the space 48.

Next, with reference to FIGS. 9 to 15, a description will be given about second to fourth embodiments of the blade mounting structure 20 of the present invention, where elements identical or similar to the elements in the first embodiment are represented by the same reference numerals as in the first embodiment and will not be described here to avoid unnecessary duplication.

Figure 9:
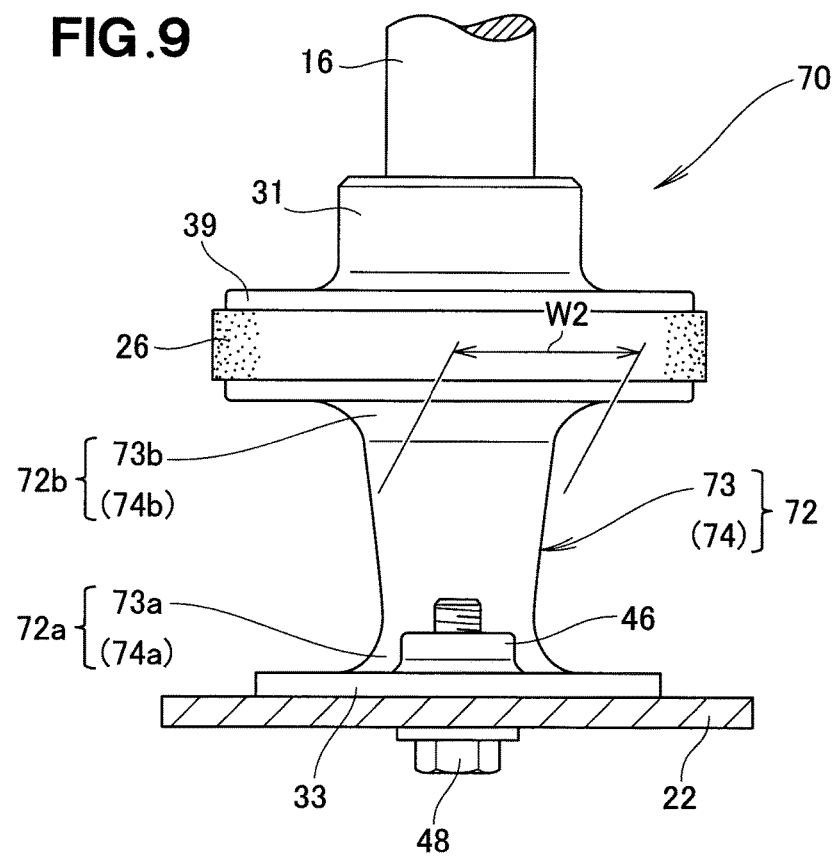
FIG. 9 is a front view of a second embodiment of the blade mounting structure of the lawn mower.

First, the second embodiment of the blade mounting structure 20 will be described with reference to FIG. 9. As shown in FIG. 9, the second embodiment of the blade mounting structure 20 is characterized in that the blade holder 21 in the first embodiment is replaced with a blade holder 70 that includes a connecting leg section 72 in place of the connecting leg section 35 in the first embodiment of the blade mounting structure 20, and the other elements of the blade holder 70 in the second embodiment are similar to those of the blade holder 21 in the first embodiment.

Similarly to the connecting leg section 35 in the first embodiment, the connecting leg section 72 includes a plurality of stay leg portions located between the shaft-mounted section 31 and the blade mounting section 33.

Hereinafter, one of the stay leg portions will be referred to as "first stay leg portion 73" while the other stay leg portion will be referred to as "second stay leg portion 74".

The first stay leg portion 73 is formed so that it has a width dimension W2 gradually decreasing in a direction from an upper end portion 73b toward a lower end portion 73a; the other structural features, such as the wall thickness dimension, of the first stay leg portion 73 are substantially similar to those of the first stay leg portion 55 in the first embodiment. The second stay leg portion 74 is formed so that it has a width dimension W2 gradually decreasing in a direction from an upper end portion 74b toward a lower end portion 74a; the other structural features, such as the wall thickness dimension, of the second stay leg portion 74 are substantially similar to those of the second stay leg portion 56 in the first embodiment.

Namely, the connecting leg section 72 is formed to gradually decrease in the width dimension W2 in a direction from an upper end portion 72b toward a lower end portion 72a. Thus, in setting a yield point of the connecting leg section 72 to an impact load (stress) substantially uniform throughout an entire region from the upper end portion 72b to the lower end portion 72a, it is possible to enhance a degree of design freedom. Further, the blade holder 70 in the second embodiment can achieve the same advantageous benefits as the blade holder 21 in the first embodiment.

Figure 10:
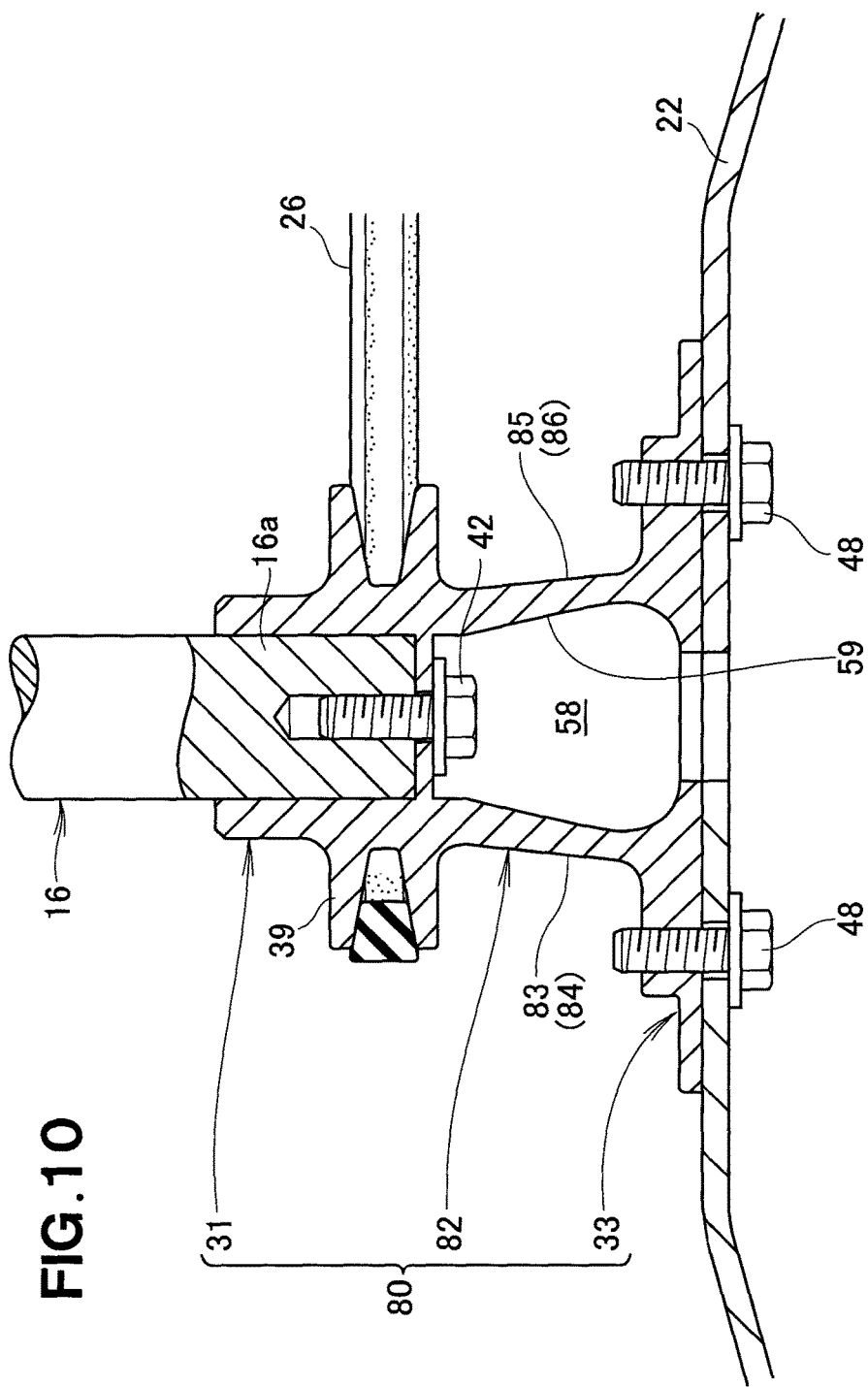
FIG. 10 is a perspective view of a third embodiment of the blade mounting structure of the lawn mower.

Next, the third embodiment of the blade mounting structure 20 will be described with reference to FIGS. 10 to 12. As shown in FIG. 10, the third embodiment of the blade mounting structure 20 is characterized in that the blade holder 21 in the first embodiment is replaced with a blade holder 80 that includes a connecting leg section 82 in place of the connecting leg section 35 in the first embodiment of the blade mounting structure 20, and the other structural features, such as the wall thickness dimension, of the blade holder 80 in the third embodiment are substantially similar to those of the blade holder 21 in the first embodiment.

Figure 11:
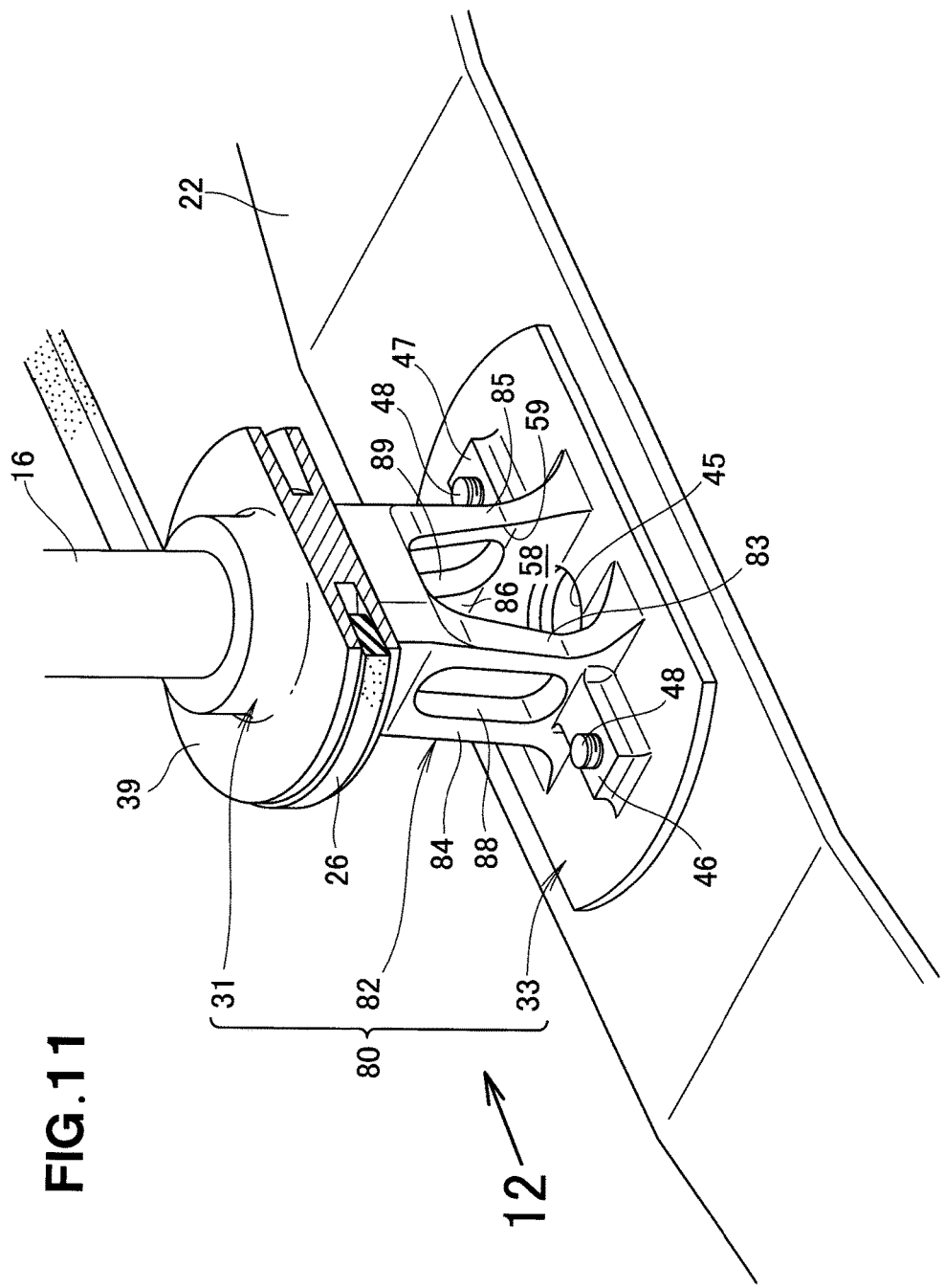
FIG. 11 is a perspective view showing the blade mounting structure of FIG. 10.
Figure 12:
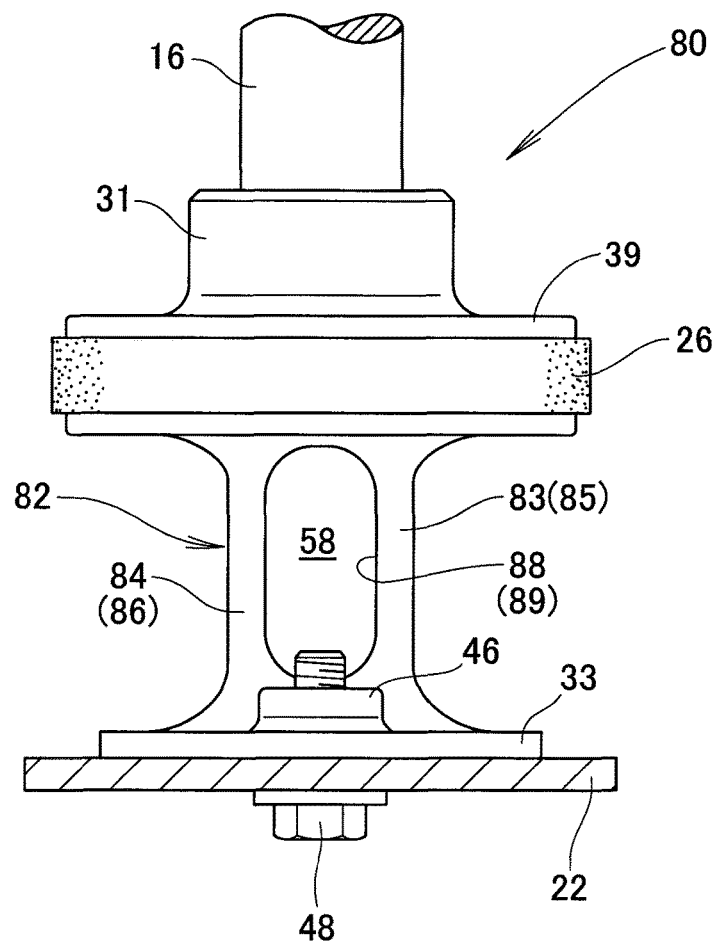
FIG. 12 is a view taken in a direction of arrow 12 of FIG. 11.

As shown in FIGS. 11 and 12, the connecting leg section 82 is formed by modifying the first stay leg portion 55 in the first embodiment to have a first leg-portion opening 88 formed therethrough and modifying the second stay leg portion 56 to have a second leg-portion opening 89 formed therethrough. With the first leg-portion opening 88 and the second leg-portion opening 89 thus formed through the connecting leg section 82, the connecting leg section 82 has a total of four, i.e. first to fourth, stay leg portions 83 to 86.

Two side openings 59 similar to the side opening 59 in the first embodiment are formed through the connecting leg section 82, one between the first and third stay leg portions 83 and 85 and another (not shown) between the second and fourth stay leg portions 84 and 86. The first leg-portion opening 88 is formed between the first and second stay leg portions 83 and 84, and the second leg-portion opening 89 is formed between the third and fourth stay leg portions 85 and 86.

Thus, the space 58 can be viewed from four directions (i.e., through the opposite side openings 59 and the first and second leg-portion openings 88 and 89). In this way, it is possible to insert a tool 63 (see FIG. 8) and perform, with an increased ease, the operation of detaching the blade holder 80 and the grass cutting blade 22 with the tool 63 inserted in the space 48. Further, the blade holder 80 in the third embodiment can achieve the same advantageous benefits as the blade holder 21 in the first embodiment.

Figure 13:
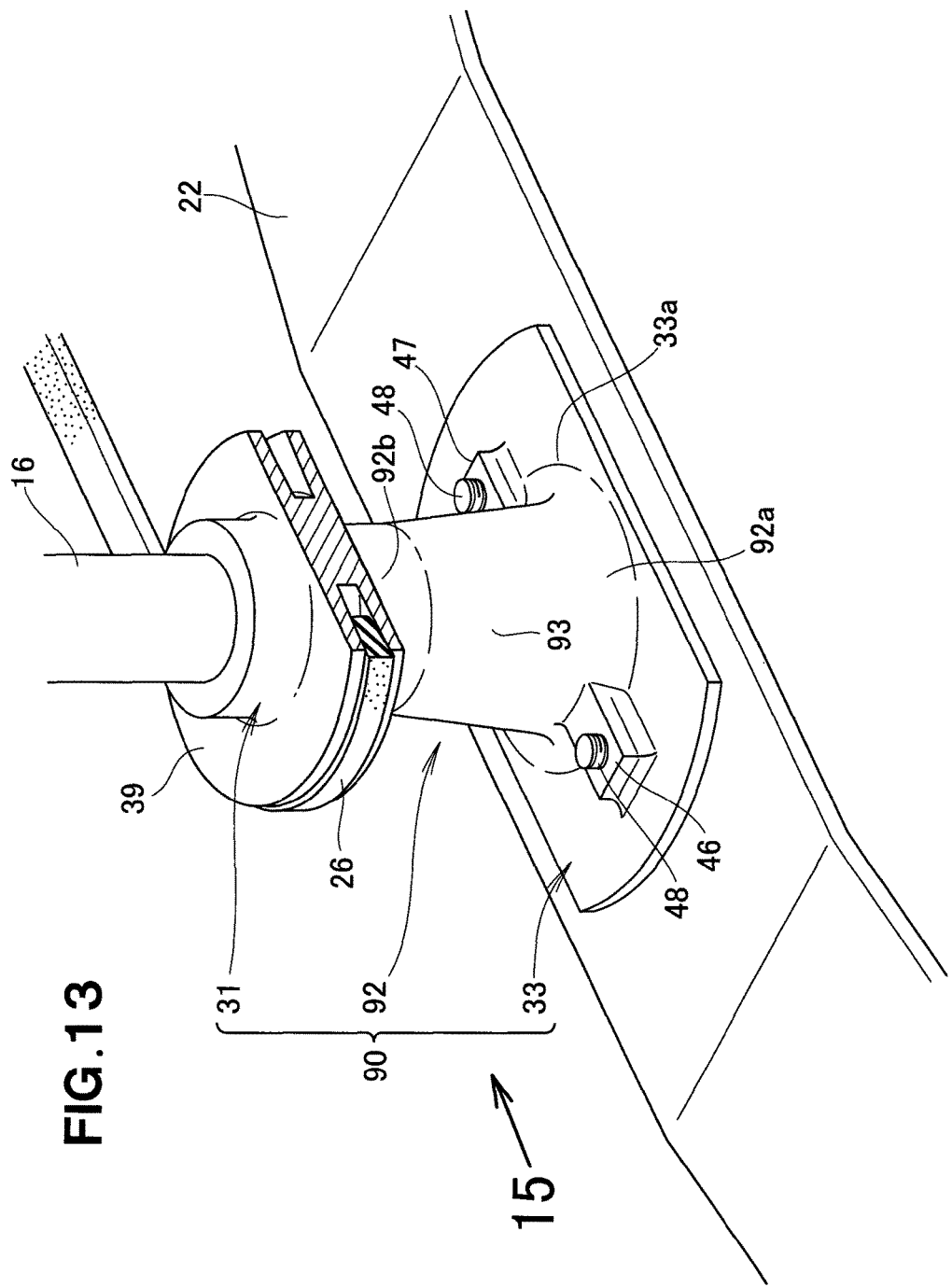
FIG. 13 is a perspective view of a fourth embodiment of the blade mounting structure of the lawn mower.

Next, the fourth embodiment of the blade mounting structure 20 will be described with reference to FIGS. 13 to 15. As shown in FIG. 13, the fourth embodiment of the blade mounting structure 20 is characterized in that the blade holder 21 in the first embodiment is replaced with a blade holder 90 that includes a connecting leg section 92 in place of the connecting leg section 35 in the first embodiment, and the other elements of the blade holder 90 in the fourth embodiment are similar to those of the blade holder 21 in the first embodiment.

The connecting leg section 92 is an impact absorbing member comprising a cylindrical leg section located between the shaft-mounted section 31 and the blade mounting section 33. Hereinafter, the connecting leg section 92 will be described as "cylindrical leg section 92". The cylindrical leg section 92 has a lower end portion 92a connecting to an outer peripheral portion 33a around the opening portion 45 of the blade mounting section 33, and an upper end portion 92b connecting to a lower-end outer peripheral portion 31c (FIG. 14) of the shaft-mounted section 31 in coaxial relation to the latter. Thus, the shaft-mounted section 31 and the blade mounting section 33 are interconnected by the cylindrical connecting leg section 92.

Figure 14:
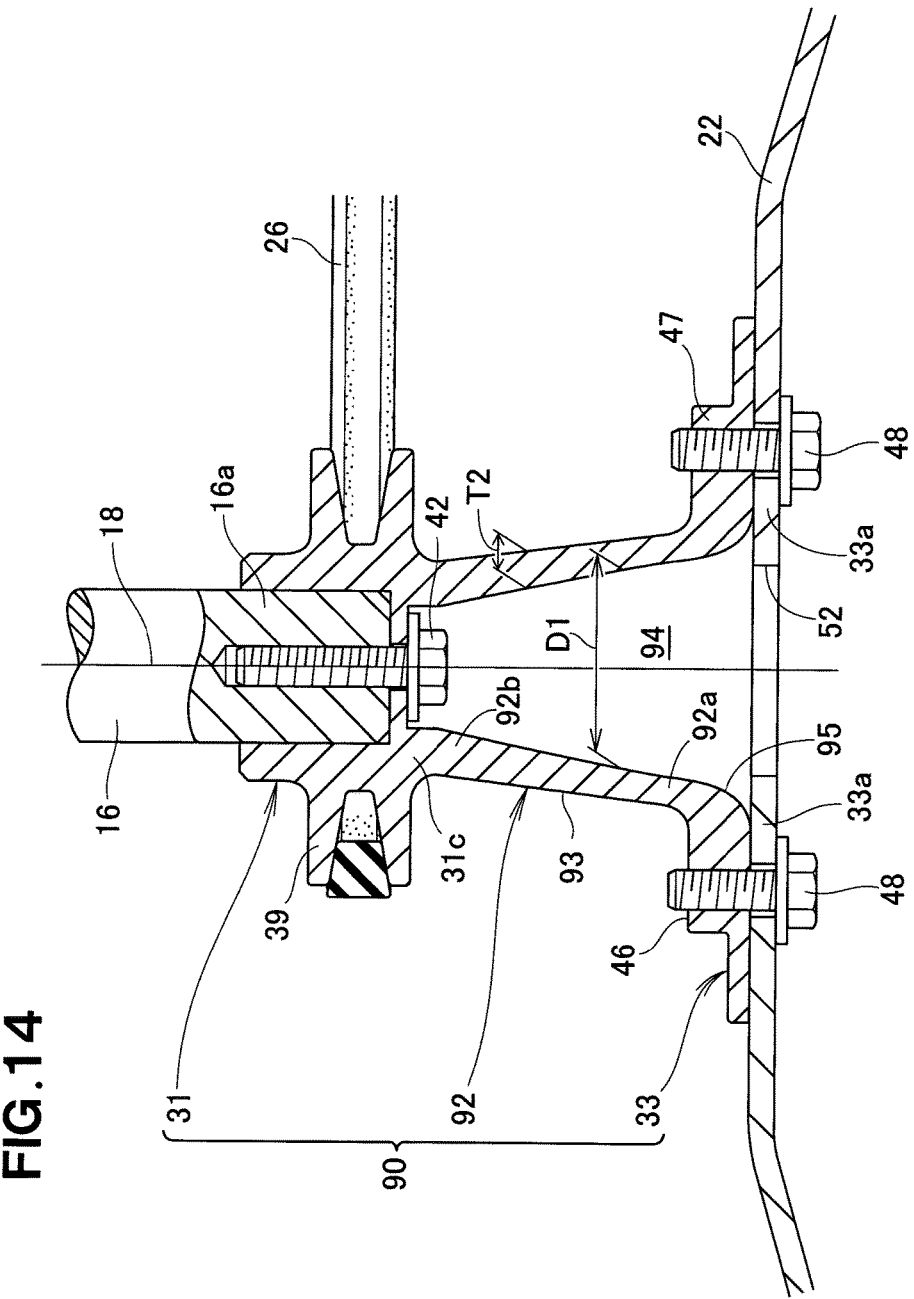
FIG. 14 is a sectional view showing the blade mounting structure of FIG. 13.
Figure 15:
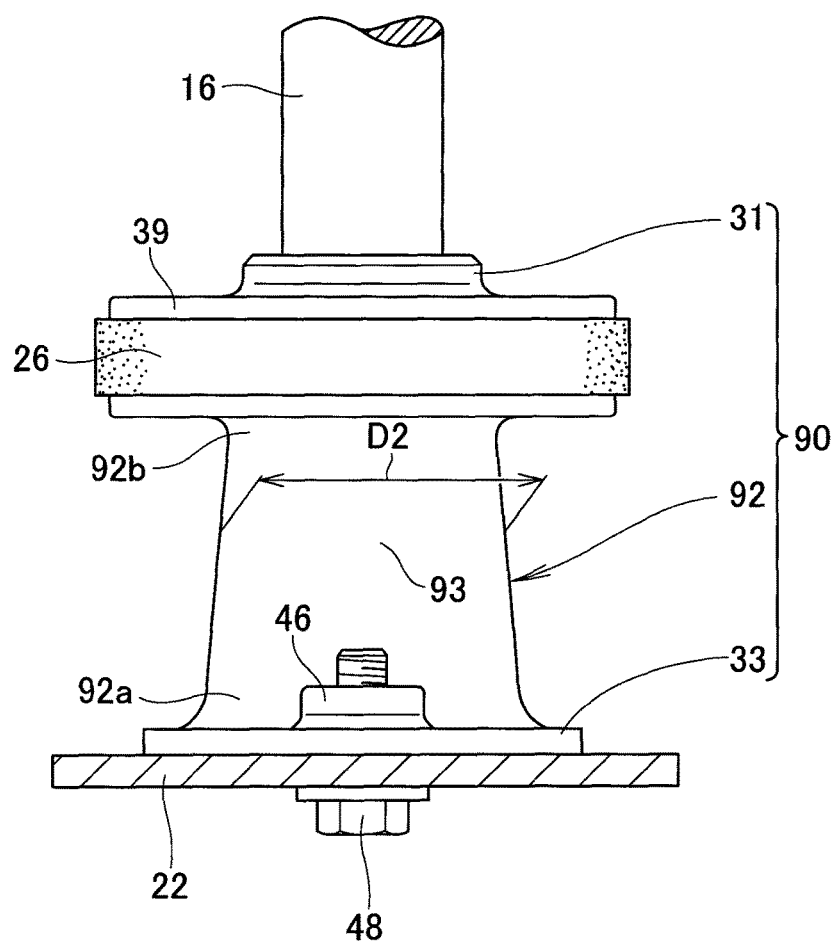
FIG. 15 is a view taken in a direction of arrow 15 of FIG. 13.

Further, as shown in FIGS. 14 and 15, the cylindrical leg section 92 has a hollow cylindrical shape such that its inner diameter D1 and outer diameter D2 gradually increase in a direction from the upper end portion 92b toward the lower end portion 92a. Thus, a space 94 gradually widening in the direction from the upper end portion 92b toward the lower end portion 92a is defined in the interior of the cylindrical leg section 92.

The cylindrical leg section 92 has an opening portion 95 formed through the lower end portion 92a in coaxial relation to the blade opening portion 52, and this opening portion 95 is in communication with the space 94. In this condition, the cylindrical leg section 92 is disposed around the central axis 18 of the output shaft 16.

The cylindrical leg section 92 has a wall thickness dimension T2 gradually decreasing in a direction from the upper end portion 92b adjoining the shaft-mounted section 31 toward the lower end portion 92a adjoining the blade mounting section 33. Thus, when a great bending moment and twisting moment (torque) have acted on the upper end portion 92b of the connecting leg section 92 due to an impact load input to the lower end portion 92a of the cylindrical leg section 92, the yield point of the cylindrical leg section 92 to the impact load can be made substantially uniform throughout an entire region from the upper end portion 92b to the lower end portion 92a.

In other words, a rigidity and strength of the cylindrical leg section 92 to the impact load are set substantially uniform throughout the entire region between the upper end portion 92b and the lower end portion 92a. In this way, it is possible to efficiently absorb the input impact load by the entire region of the cylindrical leg section 92 being deformed suitably by the impact load input to the lower end portion 92a of the cylindrical leg section 92.

Further, when grass is being cut by the grass cutting blade 22, a greater load would act on the upper end portion 92b of the cylindrical leg section 92 than on the lower end portion 92a of the cylindrical leg section 92. Because the cylindrical leg section 92 has the wall thickness dimension T2 gradually decreasing in the direction from the upper end portion 92b toward the lower end portion 92a as noted above, it is possible to suitably bear the load input from the grass cutting blade 22 to the upper end portion 92b of the cylindrical leg section 92 by way of the lower end portion 92a.

By forming the connecting leg section as the cylindrical leg section 92 as noted above, the interior (i.e., space 94) of the cylindrical leg section 92 is partitioned off from the outside by means of a peripheral wall 93 of the cylindrical leg section 92. Thus, during the grass cutting by the grass cutting blade 22, it is possible to prevent foreign substances from being rolled or dragged from the outside of the cylindrical leg section 92 into the interior space 94.

Further, the cylindrical leg section 92 has the inner diameter D1 gradually increasing in the direction from the upper end portion 92b toward the lower end portion 92a. Thus, the space 94 defined in the interior of the cylindrical leg section 92 gradually widens in the direction from the upper end portion 92b toward the lower end portion 92a. Thus, even when the connecting leg section 35 has been deformed to absorb the impact load, the space 94 can be maintained in a size enough for insertion therein of the tool. Consequently, the tool can be inserted into the space 94 through the blade opening portion 52 and the opening portion 95 so that the bolt 42 can be loosened with the inserted tool, as in the first embodiment. By such loosening of the bolt 42, the blade holder 90 can be dismounted from the output shaft 16, and the grass cutting holder 22 can be detached from the lawn mower together with the blade holder 90. Namely, the blade holder 90 in the fourth embodiment can achieve the same advantageous benefits as the blade holder 21 in the first embodiment.

It should be appreciated that the blade mounting structure of the lawn mower of the present invention is not limited to the above-described embodiments and may be modified variously. For example, whereas the first to fourth embodiments have been described above as applied to the walk-behind lawn mower 10, they may be applied to other types of lawn mowers, such as a riding type lawn mower which a human operator rides on.

Whereas the first to fourth embodiments have been described above in relation to the case where the engine 15 is employed as the power source, the present invention is not so limited, and any other type of power source, such as an electrically-driven device, may be employed as the power source.

Furthermore, the shapes and constructions of the walk-behind lawn mower, engine, output shaft, blade mounting structure, blade holder, grass cutting blade, shaft-mounted section, blade mounting section, connecting leg section, first and second stay leg portions, cylindrical leg section, etc. are not limited to those shown and described above and may be modified as necessary.

The basic principles of the present invention are well suited for application to blade mounting structures of lawn mowers where a grass cutting blade is mounted on an output shaft of a power source via a blade holder.

What is claimed is:

1. A blade mounting structure of a lawn mower, which comprises
    a blade holder including a shaft-mounted section connected to an output shaft of a power source, and a blade mounting section having a grass cutting blade mounted thereto,
    the blade holder further including a connecting leg section located between the shaft-mounted section and the blade mounting section, interconnecting the shaft-mounted section and the blade mounting section, and functioning as an impact absorbing member,
    wherein the blade mounting section is provided on an extended axial line of the output shaft and is mounted to a center part of the grass cutting blade, and
    wherein the connecting leg section comprises a plurality of stay leg portions disposed about the shaft, and an outer interval between outer surfaces of opposed stay leg portions of the plurality of stay leg portions and an inner interval between inner surfaces of the opposed stay leg portions of the plurality of stay leg portions gradually increase in the direction from the shaft-mounted section toward the blade mounting section, and a wall thickness dimension of each of the plurality of stay leg portions gradually decreases in the direction from the shaft-mounted section toward the blade mounting section,
    wherein the connecting leg section is configured to absorb a bending moment and a twisting moment resulting from an impact load which is input to a blade mounting section side portion of the connecting leg section by way of the grass cutting blade and the blade mounting section,
    wherein a yield point of the connecting leg section to the bending moment and the twisting moment is substantially uniform throughout an entire region from a shaft-mounted section side portion of the connecting leg section to the blade mounting section side portion of the connecting leg section, and
    wherein the connecting leg section is deformable to absorb the bending moment and the twisting moment resulting from the impact load prior to the shaft-mounted section and the blade mounting section.

2. The blade mounting structure according to claim 1, wherein the shaft-mounted section includes a cylindrical opening where the output shaft is inserted.

3. The blade mounting structure according to claim 1, wherein the plurality of stay leg portion are all connected to the blade mounting section, which is a single continuous member.

4. The blade mounting structure according to claim 1, wherein a rotation axis of the grass cutting blade is positioned at a center of the grass cutting blade.

5. The blade mounting structure according to claim 1, wherein a rotation axis of the grass cutting blade is positioned at a through hole.

6. A blade mounting structure of a lawn mower, which comprises
    a blade holder including a shaft-mounted section connected to an output shaft of a power source, and a blade mounting section having a grass cutting blade mounted thereto,
    the blade holder further including a connecting leg section located between the shaft-mounted section and the blade mounting section, interconnecting the shaft-mounted section and the blade mounting section, and functioning as an impact absorbing member,
    wherein the blade mounting section is provided on an extended axial line of the output shaft and is mounted to a center part of the grass cutting blade,
    wherein the connecting leg section is a cylindrical member having an axis coaxial with the output shaft, and the cylindrical member has an outer diameter and an inner diameter gradually increasing in the direction from the shaft-mounted section toward the blade mounting section, and a wall thickness dimension of the cylindrical member gradually decreases in a direction from the shaft-mounted section toward the blade mounting section,
    wherein the connecting leg section is configured to absorb a bending moment and a twisting moment resulting from an impact load which is input to a blade mounting section side portion of the connecting leg section by way of the grass cutting blade and the blade mounting section,
    wherein a yield point of the connecting leg section to the bending moment and the twisting moment is substantially uniform throughout an entire region from a shaft-mounted section side portion to the blade mounting section side portion of the connecting leg section, and
    wherein the connecting leg section is deformable to absorb the bending moment and the twisting moment resulting from the impact load prior to the shaft-mounted section and the blade mounting section.

* * * * *